United States Statutory Invention Registration [19]

Peace

[11] Reg. Number: H611

[43] Published: Apr. 4, 1989

[54] SEMI-SUBMERSIBLE VESSEL

[75] Inventor: Duncan P. Peace, Twickenham, England

[73] Assignee: Shell Oil Company, Houston, Tex.

[21] Appl. No.: 3,443

[22] Filed: Jan. 15, 1987

[30] Foreign Application Priority Data

Jan. 17, 1986 [GB] United Kingdom ..... 8601096

[51] Int. Cl.[4] ..... B63B 35/08; B63B 35/44; B63B 1/10; E02B 17/00

[52] U.S. Cl. ..... 114/264; 114/61; 114/125

[58] Field of Search ..... 114/121, 125, 264, 256, 114/266, 267, 81, 83, 356, 122

[56] References Cited

U.S. PATENT DOCUMENTS

| | | | |
|---|---|---|---|
| 3,299,846 | 1/1967 | Jarlan | 114/264 |
| 3,915,108 | 10/1975 | Rodriguez | 114/125 |
| 4,019,213 | 4/1977 | Behar et al. | 414/256 |
| 4,117,691 | 10/1978 | Spray | 114/264 |
| 4,150,635 | 4/1979 | Lloyd et al. | 114/264 |
| 4,168,556 | 9/1979 | Fink et al. | 414/264 |
| 4,345,533 | 8/1982 | Kunitake | 114/61 |
| 4,434,741 | 3/1984 | Wright et al. | 114/264 |
| 4,498,412 | 2/1985 | Liden | 114/264 |

FOREIGN PATENT DOCUMENTS 2001587 2/1979 United Kingdom .

*Primary Examiner*—David H. Brown
*Attorney, Agent, or Firm*—Mark A. Smith

[57] ABSTRACT

A semi-submersible vessel is disclosed in which a side wall which is continuous in the horizontal direction connects an underwater buoyant pontoon hull to an operating deck located above the water surface. In operation the side wall is subject to moderate cyclic fatigue stresses only, thereby increasing the useful life of the vessel.

18 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SEMI-SUBMERSIBLE VESSEL

BACKGROUND OF THE INVENTION

This invention relates to a semi-submersible vessel.

Many designs of semi-submersible floating platforms used for drilling or other offshore operations are based on the use of three or more vertical buoyant columns to support a deck at a safe distance above sea level, their bottom ends being attached to underwater chambers forming pontoons to provide additional buoyancy.

The operating deck is designed for carrying equipment and living quarters and may contribute to the rigidity of structure. The deck then forms a strong box structure enclosing a number of tween decks and integrated with the tops of the columns. Columns and bracings between columns are subject to wave and current forces and their points of attachment are susceptible to material fatigue.

SUMMARY OF THE INVENTION

The aim of the present invention is to provide an offshore platform which does not rely on columns and bracings to support an operating deck and which displays superior strength and fatigue characteristics.

A vessel according to the present invention comprises a side wall which is continuous in a horizontal direction, which wall is attached to an underwater pontoon hull at its lower end and supports an operating deck at its upper end.

BRIEF DESCRIPTION OF THE DRAWINGS

The invention will now be described by way of example with reference to the accompanying drawings, in which.

DETAILED DESCRIPTION OF THE PREFERRED EMBODIMENT

Figure 1:
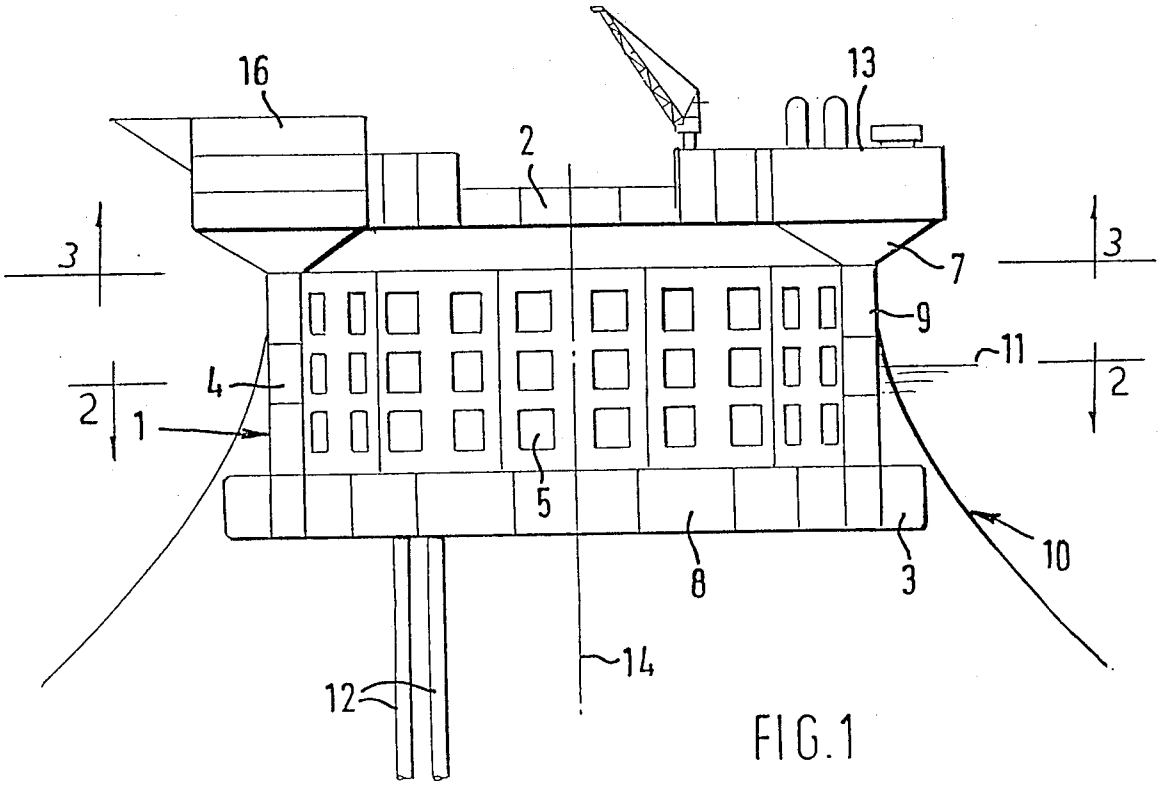
FIG. 1 is an elevation view of a semi-submersible vessel according to the invention.
Figure 2:
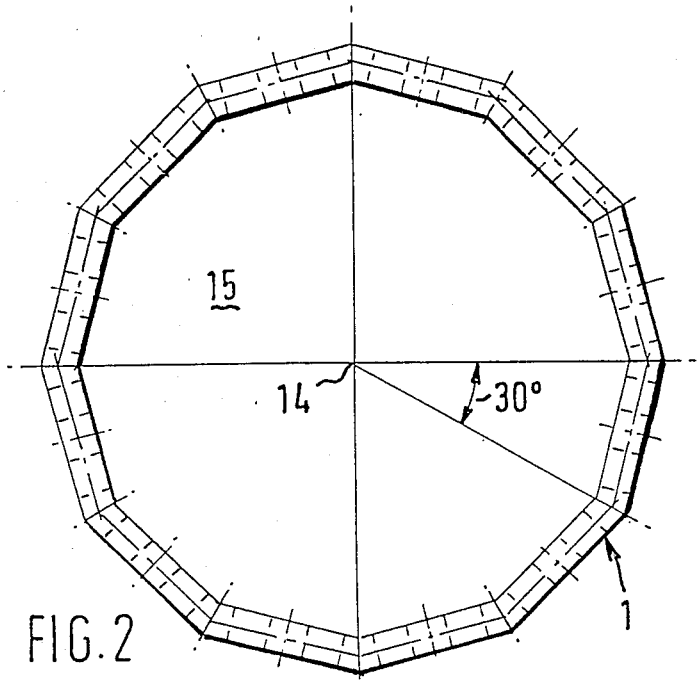
FIG. 2 is a horizontal section of the side wall of the semi-submersible vessel of FIG. 1, taken at line 2—2 therein.

The vessel shown in the drawing comprises a horizontally continuous wall 1 to support the operating deck 2. The wall 1 may be circular in plan view or multifaceted. The bottom of wall 1 is attached to a pontoon hull 3 of generally circular or multifaceted cross-section and with a similar plan shape to the wall. The operating deck 2, side wall 2 and pontoon hull 3 preferably have the shape of ring-like polygons surrounding a substantially prismatic central opening 15. Said polygons and prismatic central opening 15 preferably have a common substantially vertical axis of symmetry 14.

The wall 2 comprises a series of buoyant compartments 4. Between the buoyant compartments are perforations 5 passing through the wall to allow passage of water and waves into and from the central opening 15. These perforations 5 are necessary to reduce the wave loadings and impact forces acting on the wall and assist in reducing hull motions. The number, shape and spacing of the perforations will be designed to suit operational and constructional requirements but a permeability of 30% is typical.

Figure 3:
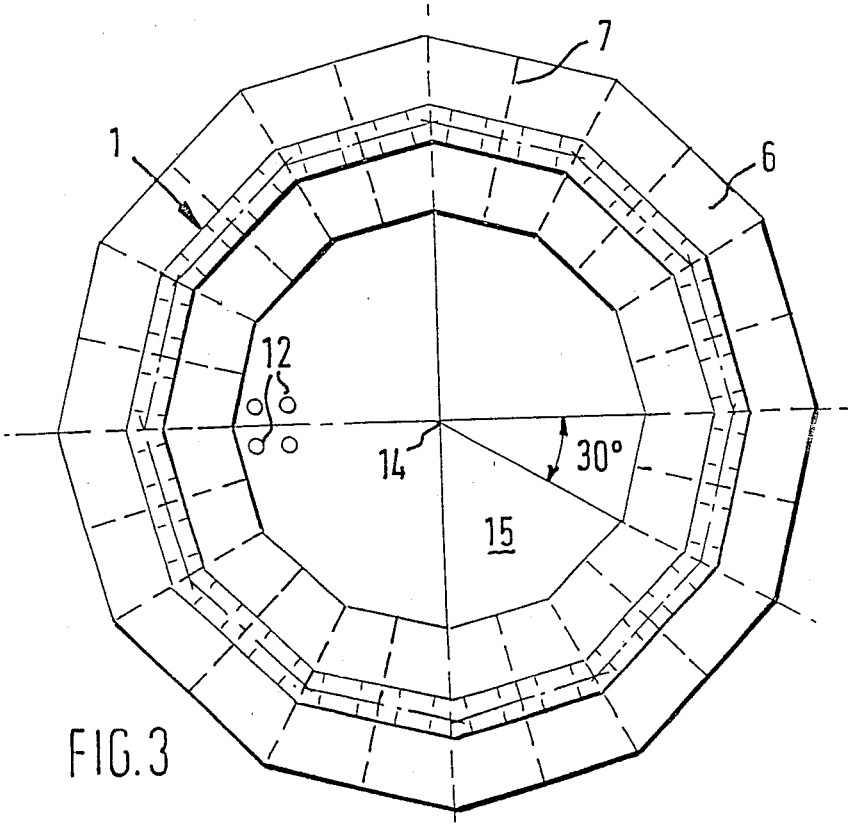
FIG. 3 is a horizontal cross-sectional view of the configuration of the operating deck of the vessel shown in FIG. 1 taken at line 3—3.

The wall 2 is self supporting and does not rely on the deck structure to provide rigidity or require cross bracings. The design of the operating deck may therefore be designed to suit operational requirements and one arrangement shown in FIG. 3 comprises a flat annular deck 6 supported on cantilever beams 7 fixed to the top of the wall. Other deck configurations are possible to suit particular operations, including a fully plated deck spanning the entire central area from wall to wall. A strong box deck can be used to contribute to the overall structural strength of the vessel.

The underwater pontoon hull 3 and side wall are divided into ballast tanks 8 connected to pumping machinery to allow the draft to be altered. Internal access to these tanks is provided for inspection purposes. Tanks in the walls 9 are also used for fuel, potable water and other consumable supplies. The vessel is held in position by catenary mooring lines 10 attached to the side wall and secured to seabed anchors (not shown).

The height of the wall is such that the waterline 11 is located approximately half the height of the wall guaranteeing that the operating deck is located well above the waves and that the pontoon is immersed to such an extent that it does not emerge during the passage of the largest waves.

The essential feature of all semi-submersibles is a small water plane area symmetrically placed in relation to the axis of symmetry of the vessel. In the semi-submersible vessel according to the invention, the average distance from the side wall 2 to the vertical axis of symmetry 14 is chosen large enough to provide the large water plan inertia necessary to produce good stability characteristics.

The vessel shown is intended to be used as an oil production vessel and is provided with flexible riser pipes 12 to conduct produced fluids from wellhead to vessel. A hydrocarbon processing plant 13 is situated on the operating deck and separated oil and gas are removed from the vessel either by flexible risers to a seabed pipeline or by tanker. Accommodation for personnel is provided in a deck house 15 separated from the hazardous areas associated with hydrocarbon operations. Surplus gas can be flared using special burners mounted on a tower or boom and a helicopter platform is provided for personnel transfer. Facilities are provided to store the vessel from a supply boat stationed adjacent to the vessel.

The embodiment described above and shown on the drawings is merely an example of the invention. The components forming part of the platform may be varied within the scope of the appended claims, which define a structure which is safe with respect to strength and stability, even in damaged conditions. The design permits easy inspection of the underwater parts and is especially suited for use in waters where icedrift is expected.

Other modifications, changes and substitutions are intended in the foregoing disclosure and in some instances some features of the invention will be employed without a corresponding use of other features. Accordingly, it is appropriate that this appended claim be construed broadly and in a manner consistent with the spirit and scope of the invention herein.

What is claimed is:

1. A semi-submersible vessel comprising an in horizontal direction continuous side wall attached at the lower end thereof to an underwater pontoon hull and supporting at the upper end thereof an operating deck, wherein the side wall and pontoon hull have each a substantially vertical axis of symmetry and surround each a central opening which is concentric to said axis.

2. The vessel of claim 1 wherein the side wall is substantially tubular shaped and is mounted on and coaxially to a substantially ring-shaped pontoon hull.

3. The vessel of claim 1 wherein structural members subdivide the wall and pontoon hull into tanks to provide buoyancy and for storage of consumable supplies and ballast water.

4. The vessel of claim 1 wherein the side wall has a positive buoyancy and is perforated to allow passage of water and waves into and from said central opening.

5. The vessel of claim 4 wherein the side wall is perforated by an array of generally rectangular perforations.

6. The vessel of claim 1 wherein the side wall forms, in a horizontal plane of cross-section, a surface of revolution and extends vertically above a pontoon hull which forms a similar surface of revolution.

7. The vessel of claim 6 wherein said surface of revolution is a polygon.

8. The vessel of claim 7 wherein said central opening extends vertically and has a substantially prismatic shape.

9. A semi-submersible vessel comprising:

an underwater pontoon hull;

a side wall which is continuous in a horizontal direction attached at the lower end thereof to the underwater pontoon hull; and an operating deck which is supported by the upper end of the side wall;

wherein the side wall and the pontoon hull are each symmetrical about a substantially vertical axis of symmetry and each surrounds a central opening which is concentric to said axis of symmetry.

10. A semi-submersible vessel in accordance with claim 9 wherein the side wall is substantially tubular shaped and the pontoon hull is substantially ring-shaped.

11. A semi-submersible vessel in accordance with claim 9 further comprising a plurality of structural members subdividing the interior of the side wall to define a plurality of tanks.

12. A semi-submersible vessel in accordance with claim 11 wherein the tanks are suitable to provide buoyancy and for storage of consumable supplies and ballast water.

13. A semi-submersible vessel in accordance with claim 9 wherein the side wall has a positive buoyancy and is perforated to allow passage of water and waves into and from said central opening.

14. A semi-submersible vessel in accordance with claim 13 wherein the side wall is perforated by an array of generally rectangular perforations.

15. A semi-submersible vessel in accordance with claim 9 wherein the side walls form a surface of revolution in a horizontal plane of cross-section which extends vertically above the pontoon hull which forms a similar surface of revolution in a horizontal plane of cross section.

16. A semi-submersible vessel in accordance with claim 15 wherein the surfaces of revolution for the side wall and the pontoon hull is a polygon.

17. A semi-submersible vessel in accordance with claim 16 wherein the central opening has a substantially prismatic shape.

18. A semi-submersible vessel comprising:

a substantially ring-shaped underwater pontoon hull which is symmetrical about a vertical axis of symmetry;

a substantially tubular shaped side wall attached at its lower end to the underwater pontoon hull and defining a central opening which is concentric with the vertical axis of symmetry, said side wall having a positive buoyancy and being continuous in a horizontal direction and further defining a plurality of perforations which allow passage of water and waves into and from said central opening;

a plurality of structural members subdividing the interior of the side wall to define a plurality of tanks; and an operating deck which is supported by the upper end of the side wall.

* * * * *